United States Patent Office 2,844,628
Patented July 22, 1958

2,844,628
PERCHLORO-METHYL-MERCAPTAN DERIVATIVES AND PRODUCTIONS

Engelbert Kuhle, Koln-Stammheim, Richard Wegler, Leverkusen, and Ferdinand Grewe, Koln-Stammheim, Germany, assignors to Farbenfabriken Bayer Aktiengesellschaft, Leverkusen, Germany, a corporation of Germany No Drawing. Application March 27, 1956
Serial No. 574,111

Claims priority, application Germany April 7, 1955

9 Claims. (Cl. 260—551)

This invention relates to perchloro-methyl-mercaptan derivatives and to a process for their production; more particularly, it relates to N-perchloro-methyl-sulphene-substituted sulfamides of the general formula $$\begin{array}{c}R\\ \diagdown\\ R^1\diagup N-SO_2-N-S-CCl_3\\ \quad\quad\quad\quad\quad |\\ \quad\quad\quad\quad\quad R^2\end{array}$$

in which R, $R^1$ and $R^2$ stand for hydrogen, alkyl or aryl radicals.

N-substituted alkyl or aryl-sulphonic acid amide perchloromethyl-mercaptanes are known to exhibit a high biological activity. These compounds act as foliage fungicides in the spore test, but their activity is substantially decreased when tested on the plants. These compounds sometimes also have phytotoxic properties.

It is an object of the present invention to provide new fungicides having excellent activity when used as foliage fungicides.

It is a further object of the invention to provide N-perchloro-methyl-sulphene-substituted sulfamides.

It is another object of the invention to provide an efficient and economic process of producing N-chloro-methyl-sulphene-substituted sulfamides having excellent fungicidal activity.

Further objects will become apparent as the following description proceeds.

According to the invention it has been found that new and powerfully fungicidal compounds are obtained by reacting N-substituted sulfamides which contain at least one free hydrogen atom on the nitrogen atom with perchloro-methyl-mercaptan. In the case of tri-methyl-sulfamide the reaction is as follows:

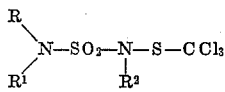

Other N-substituted sulfamides which are suitable according to the present invention include dimethylaminosulfamides, dimethylaminosulfamic acid ethylamides, dimethylamino sulphaminic acid propylamides, dimethylamino sulfamic acid butylamides, dimethylamino sulfamic acid hexylamides, dimethylamino sulfamic acid cyclohexylamides, dimethylamino sulfamic acid phenylamides, dimethylamino sulfamic acid p-chlorophenyl amides, dimethylamino sulfamic acid p-nitrophenyl amides, dimethylamino sulfamic acid 2,3-dichlorophenyl amides, dimethylamino sulfamic acid 2-chloro-4-nitro-phenyl amides, dimethylamino sulfamic acid 4-pyridyl amides, dimethylamino sulfamic acid 2-pyridyl amides, dimethylamino sulfamic acid 3-pyridyl amides, dimethylamino sulfamic acid α-naphthyl amides, dimethylamino sulfamic acid β-naphthyl amides.

Furthermore, there may be used the corresponding diethylamino sulfamides, methylethylamino sulphaminic acid amides, dipropylamino sulfamides, piperidyl amino sulfamides, piperacylamino sulfamides, pyrolidylamino sulfamides, morpholylamino sulfamides of the above-said type.

The reaction is carried out in the presence of alkali metal hydroxides or carbonates or tertiary bases as hydrochloric acid acceptors. The operation is expediently carried out in an organic solvent such as benzene, chlorobenzene or chloroform, but an aqueous medium may also be used.

Alkali metal hydroxides which are especially suitable according to the invention are sodium hydroxide and potassium hydroxide. Particularly suitable carbonates are soda and potash.

Tertiary bases which are suitable according to the present invention are trimethyl amine, triethyl amine, N-methyl piperidine and pyridine. It is also possible to prepare at first an alkali metal salt of the corresponding sulfamide and to react this salt (preferably the sodium salt) with perchloro-methyl-mercaptan. The reaction can be carried out at a temperature within the range of about 0 to 150° C., preferably about 10 to 50° C. Sometimes the reaction proceeds slightly exothermic and must be controlled by cooling.

The new compounds are intended to be used as plant-protecting agents. In addition to a good compatibility with plants they are sometimes extremely active in vivo against phytopathogenic fungi. In the following the activity of some of the compounds according to the present invention on the pathogen of potato blight (*Phytophthora infestans*) is listed and compared with the activity of some known fungicides based chiefly on alkyl or arylsulphonic acids. From this comparison the high activity of the compounds according to the invention is evident.

Potato plants (Dutch early crop) were sprayed with aqueous liquors of the indicated concentrations, artificially infected with zoosporangiae of *Phytophthora infestans* after 24 hours and placed into moist chambers. On the 6th day after infection, the infestation was ascertained and expressed in percentages of the infestation of untreated plants as 100. The results listed in the following tables show that the most powerful compounds according to the invention against *Phytophthora infestans* excel even the most active compounds hitherto known. As compared with copper-containing fungicides, they have the advantage of not impeding the growth of the plants. In addition to *Phytophthora infestans*, the compounds have a good activity on other phytopathogenic fungi such as *Plasmopara viticola* infecting vine and *Septoria apii* infecting celery.

1. *Control preparations*

| | Quantity applied | |
|---|---|---|
| | 0.1% | 0.05% |
| 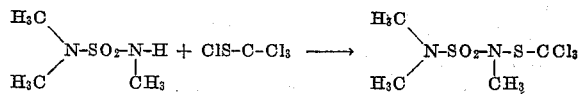 | 4 | 8 |
| | 12 | 14 |
| $C_6H_4-(p-Cl)-SO_2-N-S-CCl_3$<br>$\quad\quad\quad\quad\quad\quad\quad\quad |$<br>$\quad\quad\quad\quad\quad\quad\quad\quad CH_3$ | 41 | 46 |
| $C_6H_4-(p-NO_2)-SO_2-N-S-CCl_3$<br>$\quad\quad\quad\quad\quad\quad\quad\quad\quad |$<br>$\quad\quad\quad\quad\quad\quad\quad\quad\quad C_6H_5$ | 77 | 89 |

2. Compounds according to the invention

| | Quantity applied | |
|---|---|---|
| | 0.1% | 0.05% |
| $CH_3$—N(—$CH_3$)—$SO_2$—N(—$CH_3$)—$SCCl_3$ | 3 | 5 |
| $CH_3$—N(—$CH_3$)—$SO_2$—N(—$C_6H_5$)—$SCCl_3$ | 0.9 | 4 |

The following examples are given for the purpose of illustrating the invention:

EXAMPLE 1

To the suspension of 40 grams of the sodium salt of trimethyl sulfamide in 200 millilitres of benzene there are added dropwise with vigorous stirring 46.5 grams of perchloro-methyl-mercaptan within 15 minutes. The temperature thereby rises to about 50° C. After stirring for a half hour the solution is treated with water. The benzene layer is separated from the aqueous phase and, after drying over sodium sulphate, filtered off by suction. The solution is then concentrated in vacuo. The N-trichloro-methyl-sulphene compound is obtained in a yield of about 55 grams. Melting point 55–60° C. (from commercial benzine).

EXAMPLE 2

10 grams of N-N-dimethyl - N' - (2-chlorophenyl)-sulfamide are converted in a solution of 1.7 grams of sodium hydroxide in 50 millilitres of water into the corresponding sodium compound. After complete dissolution, there is introduced drop by drop at room temperature a solution of 8 grams of perchloro-methyl mercaptan in 20 milligrams of alcohol. The temperature thereby rises slightly. The mixture is after-stirred for about 10 minutes and the trichloro-methyl-sulphene compound of the aforesaid sulfaminde is filtered off by suction. Yield 13 grams. M. P. 127–129° C. (for methanol).

EXAMPLE 3

10 grams of N-N-dimethyl-N-phenyl-sulfamide are dissolved in 50 milligrams of 40 percent aqueous sodium hydroxide and treated with a solution of 8 grams of perchloro-methyl-mercaptan in 20 millilitres of alcohol. After briefly stirring, it is filtered off by suction from the precipitated trichloro - methylsulphene compound (12 grams) and recrystallized from methanol. M. P. 98–100° C.

EXAMPLE 4

166 grams (1/10 mol) of N-N-diethyl-N'-methyl-sulfamide are dissolved in a solution of 4 grams of sodium hydroxide in 40 millilitres of water. A solution of 12 grams of perchloro-methyl-mercaptan in 20 millilitres of alcohol is slowly added with stirring at room temperature and the mixture is after-stirred for about an hour. The separated oil is taken up with ether and the ethereal solution after drying in vacuo is concentrated. The trichloro-methyl-sulphene compound remains as a reddish brown oil.

EXAMPLE 5

13.5 grams of N-N-dimethyl-N'-(2,4-dichlorophenyl)-sulfamide are dissolved in 200 millilitres of water with the addition of 2.4 grams of NaOH. 9.3 grams of perchloro-methyl-mercaptan are added dropwise to the solution with vigorous stirring. An oil precipitates which is taken up in benzene, dried, filtered with animal charcoal and concentrated in vacuum. The reaction product precipitates crystalline. M. P. 93–96° C. (from commercial benzine).

EXAMPLE 6

11.8 grams of the sodium compound of N-N-dimethyl-N'-(4-nitrophenyl)-sulfamide are suspended in 100 millilitres of benzene and reacted with 7 grams of perchloro-methyl-mercaptan at boiling temperature. The mixture is stirred for some time, filtered off with suction and the filtrate concentrated in vacuum. The reaction product melts at 192° C.

EXAMPLE 7

21.8 grams of N-N-dimethyl-N'-(4-fluorophenyl)-sulfamide are dissolved in 150 millilitres of water with the addition of 4.0 grams of NaOH. 18.6 grams of perchloro-methyl-mercaptan are added dropwise to the solution at 15–20° C. with strong stirring. The product immediately precipitates in solid form. M. P. 100° C.

EXAMPLE 8

49 grams of the sodium compound of N-N-dimethyl-N'-(2.4-dimethyl-phenyl)-sulfamide are reacted dropwise with 36.4 grams of perchloro-methyl-mercaptan in benzene solution at boiling temperature. After working up as usual the reaction product of the M. P. 70–72° C. is obtained.

EXAMPLE 9

53.9 grams of the sodium compound of N-N-dimethyl-N'-(2-ethylphenyl)-sulfamide are reacted in toluene at 100° C. with 40.1 grams of perchloro-methylmercaptan. After working up as usual the end product of the M. P. 78–79° C. is obtained.

EXAMPLE 10

50.9 grams of the sodium compound of N-N-dimethyl-N'-(2-ethyl-6-methyl-phenyl) sulfamide are treated at 100° C. with 35.9 grams of perchloro-methylmercaptan in toluene solution. The reaction product obtained after working up as usual is an oil which does not crystallize.

EXAMPLE 11

3.8 grams of the sodium compound of N-N-dimethyl-N'-benzyl-sulfamide are reacted with 3.0 grams of perchloro-methyl-mercaptan in boiling benzene. The reaction product melts at 60–66° C.

EXAMPLE 12

18.8 grams of the sodium compound of N-N-dimethyl-N'-(n-propyl)-sulfamide are stirred in 100 millilitres of benzene with 18.6 grams of perchloromethyl-mercaptan at 50–60° C. for one hour. The precipitated common salt is filtered off with suction and the filtrate concentrated in vacuum. The reaction product remains as an yellow-brown oil.

EXAMPLE 13

22 grams of N-N-dimethyl-N'-(4-methyl-cyclohexyl)-sulfamide are dissolved in 100 millilitres of water with the addition of 4.4 grams of NaOH. The solution of 18.6 grams of perchloro-methyl-mercaptan in 50 millilitres of alcohol is added dropwise at room temperature with vigorous stirring. The product precipitates in form of an oil. After redissolving from methanol the compound shows the melting point 80–87° C.

EXAMPLE 14

15.2 grams of N-N-dimethyl-N'-(2-methoxy-phenyl)-sulfamide are dissolved in 200 millilitres of water with the addition of 3 grams of NaOH. 12.3 grams of perchloro-methyl-mercaptan are slowly added in drops while cooling with water. The mixture is afterstirred for 15 minutes and filtered off with suction. M. P. 125–127° C. (from methanol).

EXAMPLE 15

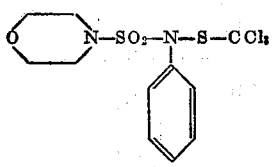

15 grams of morpholinic-sulfoanilide-sodium are treated in 150 millilitres of benzene with 10.6 grams of perchloro-methyl-mercaptan and stirred for one hour at room temperature. The common salt is filtered off with suction and the filtrate concentrated in vacuum. The reaction product precipitates crystalline. M. P. 146–147° C. (after recrystallizing from alcohol).

EXAMPLE 16

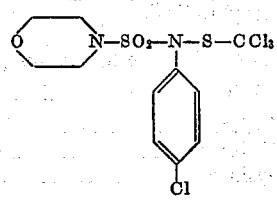

16 grams of morpholinic-sulfo-(4-chloroanilide) sodium are reacted in 150 millilitres of benzene with 106 grams of perchloro-methyl-mercaptan. The mixture is after-stirred for a short period, the common salt filtered off with suction and the solution concentrated in vacuum. The product obtained melts at 140–143° C.

EXAMPLE 17

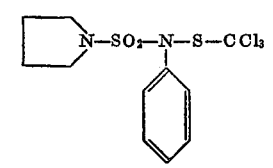

30.5 grams of pyrrolidine-sulfoanilide-sodium are reacted at 40° C. in 200 millilitres of benzene with 22.4 grams of perchloro-methyl-mercaptan. After briefly stirring the common salt is filtered off with suction and the solution concentrated in vacuum. The product melts at 117–119° C. (from methanol).

EXAMPLE 18

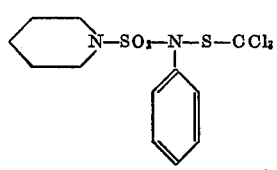

40 grams of N-N-pentamethylene-N'-phenylsulfamide are converted to the sodium compound in a solution of 6.7 grams of NaOH in 50 millilitres of water. The aqueous solution is diluted with 130 millilitres of methanol, 23 grams of pherchloro-methyl-mercaptan are slowly added in drops at room temperature and the solution is stirred for further 30 minutes. The trichloro-methyl-sulfene compound of the sulfamide is thus obtained. M. P. 113–115° C. (from alcohol).

EXAMPLE 19

10 grams of N-N-dimethyl-N'-(4-chlorophenyl)- sulfamide are reacted analogously to the procedure of Example 2. The reaction obtained melts at 100–103° C. (after recrystallizing from methanol).

EXAMPLE 20

21.4 grams of N-N-dimethyl-N'-(2-methyl-phenyl)-sulfamide are dissolved in a solution of 4 grams of NaOH in 80 millilitres of water with the addition of 20 millilitres of methanol and treated dropwise at room temperature with 18 grams of perchloro-methyl-mercaptan. An oil precipitates which is taken up in ether. After evaporating the ether a crystalline residue remains which melts at 88° C. (after recrystallizing from methanol).

The corresponding 4-methyl-phenyl-sulfamide is obtained analogously. M. P. 118– 120° C.

EXAMPLE 21

20.9 grams of the sodium compound of N-N-dimethyl-N'-(1-naphthyl) sulfamide are suspended in 100 millilitres of toluene and 14.3 grams of perchloromethylmercaptan are added dropwise at room-temperature. The temperature rises to about 35° C. The mixture is stirred for a further hour, the sodium chloride is filtered off and the filtrate concentrated in vacuum. An oily residue is thus obtained, which crystallizes by treatment with ether/petroleum ether. The reaction product melts at 86–89° C.

EXAMPLE 22

20.1 grams of N-N-dimethyl-N'-(2-pyridyl) sulfamide are dissolved in 200 millilitres of water with the addition of 4 grams of NaOH. 18.6 grams of perchloromethylmercaptan are added dropwise to the solution with vigorous stirring at room-temperature. The reaction product immediately precipitates. After briefly stirring the mixture is filtered off with suction and the residue washed with water. M. P. 94° C.

We claim:

1. Process for the production of trichloro-methyl sulphene derivatives of substituted sulfamides which comprises reacting perchloro-methylmercaptan with N-substituted sulfamides of the general formula

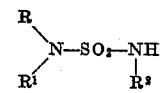

in which R, R¹ and R² each stand for a member selected from the group consisting of hydrogen, alkyl and aryl radicals, in the presence of an acid-binding agent at a temperature of 0–150° C.

2. Process for the production of trichloro-methyl sulphene derivatives of substituted sulfamides which comprises reacting perchloro-methylmercaptan with N-substituted sulfamides of the general formula

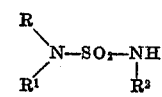

in which R, R¹ and R² each stand for a member selected from the group consisting of hydrogen, alkyl and aryl radicals, in the presence of an acid-binding agent at a temperature of 10–50° C.

3. N-perchloro-methylsulphene - substituted sulfamides of the general formula

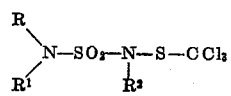

in which R, R¹ and R² each stand for a member selected from the group consisting of hydrogen, alkyl and aryl radicals.

4. A compound of the following formula

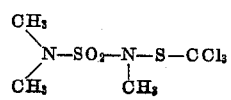

5. A compound of the following formula

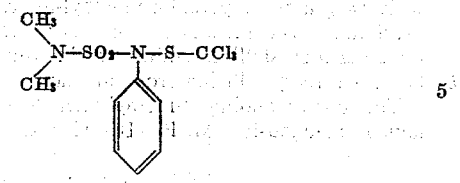

6. A compound of the following formula

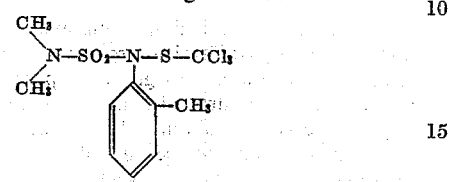

7. A compound of the following formula

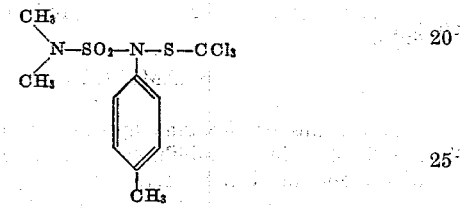

8. A compound of the following formula

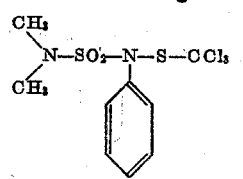

9. N-percholoro-methylsulphene-substituted sulfamides of the general formula

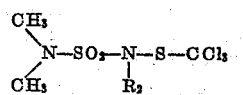

wherein $R_2$ is a phenyl radical.

References Cited in the file of this patent
UNITED STATES PATENTS

| | | |
|---|---|---|
| 2,653,155 | Kittleson | Sept. 22, 1953 |
| 2,713,058 | Kittleson | July 12, 1955 |
| 2,779,941 | Gysin et al. | Jan. 29, 1957 |

OTHER REFERENCES

Paquin Angew Chem., vol. A-60, pp. 316-320 (1948).

UNITED STATES PATENT OFFICE
CERTIFICATE OF CORRECTION

Patent No. 2,844,628  
July 22, 1958  
Engelbert Kuhle et al.

It is hereby certified that error appears in the printed specification of the above numbered patent requiring correction and that the said Letters Patent should read as corrected below.

Column 3, line 48, for "50 milligrams of 40 percent" read -- 50 milliliters of 40 percent --; line 57, for "166 grams" read -- 16.6 grams --; column 5, line 27, for "106 grams" read -- 10.6 grams --; line 59, for "pherchloro-" read -- perchloro- --.

Signed and sealed this 9th day of June 1959.

(SEAL)  
Attest:

KARL H. AXLINE  
Attesting Officer

ROBERT C. WATSON  
Commissioner of Patents